US009528048B2

(12) United States Patent
Esteban Cubillo et al.

(10) Patent No.: US 9,528,048 B2
(45) Date of Patent: Dec. 27, 2016

(54) METHOD FOR OBTAINING HIERARCHICALLY ORDERED INORGANIC PHOSPHATE STRUCTURES ON PHYLLOSILICATES

(75) Inventors: Antonio Esteban Cubillo, Madrid (ES); Julio Santaren Rome, Madrid (ES); Eduardo Aguilar Diez, Madrid (ES); Antonio Alvarez Berenguer, Madrid (ES); Elena Palacios Zambrano, Madrid (ES); Maria Pilar Leret Molto, Madrid (ES); Jose Francisco Fernández Lozano, Madrid (ES); Antonio Heliodoro De Aza Moya, Madrid (ES); Miguel Angel Rodriguez Barbero, Madrid (ES)

(73) Assignee: TOLSA, S.A., Madrid (ES)

( * ) Notice: Subject to any disclaimer, the term of this patent is extended or adjusted under 35 U.S.C. 154(b) by 190 days.

(21) Appl. No.: 14/366,145

(22) PCT Filed: May 14, 2012

(86) PCT No.: PCT/ES2012/070340
§ 371 (c)(1),
(2), (4) Date: Jul. 22, 2014

(87) PCT Pub. No.: WO2013/093139
PCT Pub. Date: Jun. 27, 2013

(65) Prior Publication Data
US 2014/0336318 A1    Nov. 13, 2014

(30) Foreign Application Priority Data
Dec. 21, 2011  (ES) .................................. 201132063

(51) Int. Cl.
C08K 9/00        (2006.01)
C09K 21/12       (2006.01)
C08K 3/32        (2006.01)
C08K 3/34        (2006.01)
C08K 5/5415      (2006.01)
C09C 1/28        (2006.01)
C09K 21/04       (2006.01)
C01B 25/36       (2006.01)
C01B 25/26       (2006.01)
C01B 25/37       (2006.01)

(52) U.S. Cl.
CPC .............. *C09K 21/12* (2013.01); *C01B 25/26* (2013.01); *C01B 25/36* (2013.01); *C01B 25/375* (2013.01); *C08K 3/32* (2013.01); *C08K 3/34* (2013.01); *C08K 5/5415* (2013.01); *C09C 1/28* (2013.01); *C09K 21/04* (2013.01); *C01P 2004/62* (2013.01); *C01P 2004/64* (2013.01); *C01P 2006/32* (2013.01); *C08K 2003/327* (2013.01); *C08K 2003/328* (2013.01)

(58) Field of Classification Search
CPC .......... C09K 21/12; C09K 21/04; C09K 3/34; C09K 5/5415
See application file for complete search history.

(56) References Cited

U.S. PATENT DOCUMENTS

| 5,630,979 A | * | 5/1997 | Welz ...................... B41M 5/267 264/400 |
| 6,632,442 B1 | | 10/2003 | Chyall et al. |
| 2006/0287191 A1 | * | 12/2006 | Santaren Rome ...... C01B 33/38 502/60 |

FOREIGN PATENT DOCUMENTS

| DE | 19517501 | 11/1996 |
| GB | 1 565 740 | 4/1980 |
| WO | 03/106547 | 12/2003 |

OTHER PUBLICATIONS

European Search Report issued Jul. 17, 2015 in corresponding European Patent Application No. 12 86 0203.
International Search Report issued Sep. 20, 2012 in International (PCT) Application No. PCT/ES2012/070340.
Huang et al., "A novel intumescent flame retardant-functionalized montmorillonite: Preparation, characterization, and flammability properties", Applied Clay Science, vol. 51, Feb. 2011, pp. 360-365.
Kiliaris, P., "Polymer/layered silicate (clay) nanocomposites: An overview of flame retardancy", Progress in Polymer Science, vol. 35, Mar. 2010, pp. 902-958.
Modesti et al., "Synergism between flame retardant and modified layered silicate on thermal stability and fire behaviour of polyurethane nanocomposite foams", Polymer Degradation and Stability, vol. 93, Aug. 2008, pp. 2166-2171.

* cited by examiner

*Primary Examiner* — Hannah Pak
(74) *Attorney, Agent, or Firm* — Wenderoth, Lind & Ponack, L.L.P.

(57) ABSTRACT

The present invention relates to a method for preparing hierarchically ordered structures of inorganic phosphate particles, homogeneously deposited on the surface of a phyllosilicate, which is characterized in that it comprises the following steps: a) obtaining an acid solution of precursor compounds of an inorganic phosphate; b) preparing a dispersion of particles of a phyllosilicate in aqueous medium and acidifying the phyllosilicate dispersion by adding at least one acid, thereby obtaining an acid dispersion; c) mixing the acid solution obtained in step a) with the dispersion obtained in step b); and d), with stirring, adding a base to the mixture obtained in step c) until the required pH value for precipitating the corresponding inorganic phosphate on the phyllosilicate particles has been achieved, resulting in a hierarchically ordered structure of homogeneously distributed submicrometric or nanometric inorganic phosphate particles supported on the phyllosilicate surface.

38 Claims, 7 Drawing Sheets

METHOD FOR OBTAINING HIERARCHICALLY ORDERED INORGANIC PHOSPHATE STRUCTURES ON PHYLLOSILICATES

The present invention relates to a process for obtaining hierarchically ordered inorganic phosphate structures on phyllosilicates, as well as to the use thereof as a flame retardant additive for polymers. The invention may therefore fall within the field of flame retardant additives for polymers.

STATE OF THE ART

One characteristic of polymers is their relative flammability. Therefore, new approaches for improving this behaviour are currently being sought, for example, by using flame retardants. Flame retardants thus improve the fire resistance of the base material and prevent or reduce the production of toxic and/or corrosive gases during combustion. In many cases, these formulations provide remarkable improvements in other properties of the polymer as well, including mechanical or rheological improvements, thermal stabilisation, gas permeability, etc.

Retardants of very different nature exist on the market. Furthermore, actuation and fire protection mechanisms also differ one from another. These mechanisms may involve, inter alia, forming a non-flammable soot layer on the surface of the material. This layer of soot or carbonaceous residue plays a crucial role, preventing fuel gasses and melted polymer from passing towards the flame and protecting the material against the thermal energy supply. However, in order to obtain the desired requirements, using one particular type of retardant it is not generally enough. Different agents are normally added in order to obtain synergistic behaviours, enhancing fire resistance. The most commonly used retardants are halogenated compounds. However, numerous international directives and regulations restrict the use thereof (EN 135501, CDP 89/106/EEC, EN 45545), since they generate noxious and toxic gases during combustion, such as dioxins and furans [D. Santillo, P. Johnston., Environment International, September 2003, 725-734]. Amongst conventional, non-harmful retardants, metal hydroxides, zinc borates, nitrogen compounds, phosphorus compounds, special clays, etc., may be mentioned. In addition to the nature and structure of the retardant, another crucial aspect is the dispersion of the agent within the matrix, which affects the final yield. One notable improvement in the flame retardant properties has been demonstrated by increasing the reactivity of the retardant agents, as is the case when they are submicrometric or nanometric sized, i.e., when they are smaller than 1 micron and preferably smaller than 100 nm. However, the problems derived in the dispersion also increase when materials so finely divided are used, especially if they are nanoparticled in nanometric sizes. Whilst different procedures are widely addressed in the specialised literature, a procedure which efficiently enables the synergistic use of combinations of nanometric retardant agents is unknown in the state of the art.

With respect to phosphorus compounds, they release a polymeric form of phosphoric acid during combustion, causing the formation of the soot layer on the surface. There are many phosphorous retardants, including red phosphorus, phosphonates, phosphinates, ammonium phosphate and aluminium phosphate. However, even though they promote the formation of the protective layer, the mechanical properties thereof are not completely satisfactory, since they lack a desirable consistency and often appear cracked. For example, Patent GB 1,485,828 claims the production of synthetic resin foams with fire retardant properties, to which additives are added in order to improve, amongst other things, the flame resistant properties, the phosphorus compounds being found amongst the great variety of substances for achieving said end.

Phosphates are a family of compounds that have been known about for many years for their polymerisation ability, being employed, amongst other applications, in residential construction. The use thereof as a binder in the ceramic field, for example, for refractory materials is more than well-known and has given rise for many years to a multitude of patents, including as: ceramic binder; additive for pigments (Patents ES 347.891, ES 385.956, ES 407.749, ES 417.124, ES 2.000.396, EU 0.615.953); catalyst supports (Patents ES 2.001.762, ES 2.009.775, ES 2.091.973); sealing materials (Patent EU 0.600.741) or protective coatings against corrosion (Patent ES 8.207.096).

In another aspect, the possibility of obtaining phosphates from, for example, metal cations, in the form of nanoparticles with high reactivity, is widely known about in the state of the art. Nonetheless, the limitations of the art found lie in the agglomeration state of the nanoparticles of the metal phosphates. Whilst obtaining nanoparticles of various metal cations is possible by means of various methods, subsequent treatments are generally required in order to reduce the agglomeration state, which is not sufficiently effective in some cases. As a result, these nanoparticled metal phosphates are not suitably dispersed when they are incorporated into different systems, such as polymer matrices. Heat treatments are also required to crystallise the metal phosphates and formation processes for the production of compact materials.

In another aspect, one of the main disadvantages of some retardants is the fact that they require very high concentrations so as to be efficient. For example, metal hydroxides—mainly $Al(OH)_3$ and $Mg(OH)_2$—require concentrations of up to 50-75% or even higher in some cases [F. Laoutid, L. Bonnaud, J. M. López-Cuesta, Ph. Dubois. Materials Science and Engineering, January 2009, 100-125], undermining some of the properties of the base material, such as its mechanical properties. For example, Patent GB 2,436,395 deals with obtaining a conductive wire with two protective coatings, wherein the first comprises a material formed by a mixture of polymer and flame resistant agents, including $Al(OH)_3$ and $Mg(OH)_2$. In said layer, the concentration of heat resistant filler is between 65 and 99% by weight.

In recent years, formulations containing special clays, of the laminar and pseudo-laminar phyllosilicate varieties, are being used more frequently as additives to improve the behaviour of polymers against fire, in combination with conventional flame retardants. The use of these phyllosilicates inhibits or hinders combustion, since they modify the thermal conductivity and viscosity of the resulting material. Phyllosilicates also improve the integrity of the soot layer. A widely used laminar phyllosilicate is montmorillonite. This laminar clay is often incorporated in its organically modified form, facilitating the compatibilisation of the hydrophilic surface of the phyllosilicate with the polymer matrix, thus achieving the exfoliation and dispersion of the lamellae thereof. However, given the organic nature of the modifier, the use of this additive is restricted to systems wherein high processing temperatures are not required, since they would degrade the organic chains of the modifier. Patent Application GB 2,400,107 claims the production of a fire resistant material from polyurethane foam by adding laminar silicates, preferably montmorillonite. Likewise, the patent discloses the possibility of adding other retardants, including aluminium trioxide and ammonium polyphosphate.

Another type of special clay commonly used as filler is sepiolite, which may be used to improve the mechanical, thermal and gas barrier properties of polymers. This clay belongs to the group of pseudo-laminar silicates, characterised in that the shape of their particles is not laminar but acicular, in microfiber form, with an average length of 1 to 2 μm. The use of this clay as flame retardant additive in polymers with synergistic effects, along with other retardant agents has also been described [T. Dhanushka Hapuarachchi, Ton Peijis. Composites Part A: Applied Science and Manufacturing, August 2010, 954-963].

The incorporation of relatively low amounts of clays, such as montmorillonite and sepiolite, may reduce the required amount of other flame retardants, such as metal hydroxides, notably, in order to achieve similar fire retardant results. However, despite the improvement made to these systems as a result of the synergy of both agents and the fact that phyllosilicates improve the integrity of the soot layer, the performance of this generated protective layer remains unsatisfactory. The main problem is that said barrier usually has a low mechanical strength.

DESCRIPTION OF THE INVENTION

The present invention achieves, in a simple, inexpensive and feasible way, the production of materials with hierarchically ordered structures of inorganic phosphates on phyllosilicates. This kind of material, especially those based on pseudo-laminar phyllosilicates such as sepiolite and attapulgite, make it possible to improve, in a remarkable and unexpected manner, the behaviour of the flame and temperature, when incorporated into a polymer matrix. These materials may be suitably incorporated and dispersed in these polymer matrices, in order to obtain a homogeneous dispersion throughout the polymer, thus preventing the agglomeration thereof. Furthermore, upon increasing the temperature as a result of the fire, a polymerisation reaction giving rise to the formation of a more consistent and homogeneous protecting barrier than the soot layers obtained from conventional flame retardants occurs. Consequently, the use of these hierarchically ordered inorganic phosphate structures such as, for example, aluminium phosphate on phyllosilicates and, in particular, on sepiolite or attapulgite, corrects the existing problem of the lack of rigidity and firmness of the carbonaceous residue generated. As noted, the carbon acts as a protective barrier, limiting heat transfer within the material, the volatilisation of the degradation products and the diffusion of the oxygen needed to produce and maintain said combustion. However, with the current techniques, said layer lacks the adequate stability needed for optimal performance. The product of the invention overcomes this disadvantage, since it generates an inorganic polymer during the combustion period, the net of which gives rise to a protective layer with ceramifiable character, which has excellent mechanical properties of rigidity and compactness, thus creating superb flame resistance.

Specifically, the invention relates to a method for obtaining hierarchically ordered inorganic phosphate structures on phyllosilicates. Said structures comprise an arrangement of submicrometric or even nanometric sized phosphates of metal cations on phyllosilicates. These hierarchically ordered structures are obtained in powder form by the chemical methods described herein.

The present invention provides a method for obtaining nanoparticles of phosphates of metal cations using phyllosilicate particles. The resulting product is a material wherein the nanoparticles of phosphates of metal cations are hierarchically ordered on the phyllosilicate particles. Hierarchically ordered means that the smallest particles of phosphates of metal cations, of submicrometric or nanometric size, are supported by larger sized particles of the phyllosilicates. The resulting product is obtained by means of a chemical process that comprises using at least one solution of the metal cations, at least one suspension of the phyllosilicates and at least one precipitating agent of the metal cation. The chemical process for preparing hierarchically ordered structures of inorganic phosphate particles homogenously deposited on the surface of a phyllosilicate of the present invention comprises the following steps:

a) obtaining an acid solution of the precursor compounds of an inorganic phosphate, b) preparing a dispersion of particles of a phyllosilicate in aqueous medium and acidifying the phyllosilicate dispersion by adding an acid, thereby obtaining an acidic dispersion of the phyllosilicate, c) mixing the acid solution obtained in step a) with the dispersion obtained in step b), thereby obtaining a homogeneous suspension, and d) with stirring, adding a base to the mixture obtained in step c) until the required pH value for precipitating the corresponding inorganic phosphate on the phyllosilicate particles has been achieved, resulting in a hierarchically ordered structure of submicrometric or nanometric inorganic phosphate particles, dispersed and supported on the phyllosilicate surface.

In step a) the precursor compounds of the inorganic phosphate refer to precursor compounds of the phosphate anion and precursor compounds of the inorganic cation, which must react with one another in order to produce the corresponding phosphate. The precursor compound of the metal cation may be a compound of the hydroxide, carbonate or oxide variety, amongst others.

The inorganic phosphate cation may be selected from the group comprised of Al, Zn, Cd, Fe, Sn, Mn, Ni, Co, B, Sb, W, Mo, Zr, Cu, Ga, In, Be, Mg, Ca, Sr, Ba, $NH_4OH$, Li, Na, K, Rb, Cs and mixtures thereof.

The acid solution of the precursor compounds of an inorganic phosphate may be obtained by dissolving the precursor compound of the cation in an acid solution comprising at least phosphoric acid.

Alternatively, the acid solution of the precursor compounds of an inorganic phosphate according to step a), may be obtained by means of:

a1) preparing a solution or dispersion of a compound of the precursor cation of the inorganic phosphate, and a2) adding an acid solution comprising at least phosphoric acid to the solution or dispersion prepared in step a1).

Subsequent to step d), the hierarchically ordered structure may optionally be subjected to a filtering and washing process.

The surface of the hierarchically ordered structure obtained by adding an organic modifier may optionally be organo-functionalised.

The hierarchically ordered structure obtained may optionally be dried.

The hierarchically ordered structured obtained may optionally be ground or conditioned in powder form.

Depending on the characteristics sought in the product, the synthesis method used may be adapted to obtain a wide range of powdery materials, which may be applied as a flame retardant agent. Therefore, for example, in order to obtain aluminium dibasic phosphates, the phosphate is precipitated by adding an alkaline solution to the solution obtained in step c), until a final pH of 10 is reached.

In the process for obtaining an aqueous solution of the metal cation may begin with a salt of said cation, for example aluminium sulphate, amongst others, when obtaining aluminium phosphate, which dissolves in water by stirring is desired. The solution is obtained by means of mechanical stirring using, for example, a paddle stirrer. Decreasing the particle size of the salt of the metal cation promotes the corresponding dissolution process. The concentration of the salt is within the range allowing complete dissolution thereof.

Optionally, according to the present invention, one variation of the process for obtaining the aqueous dissolution consists in the use, according to step a1), of a dispersion in aqueous medium of particles of water-insoluble, but acid-soluble compounds of metal cations such as, for example, aluminium hydroxide, amongst others. The solid precursors for obtaining the particle dispersion may optionally be selected from hydroxides, carbonates, oxalates and even oxides of the metal cations or mixtures thereof. In the present invention method, said precursors are dissolved in step a2) of the process, by means of the subsequent addition of phosphoric acid or by means of digestion with an acid mixture, comprising phosphoric acid and other acids, such as, for example, a hydrochloric acid solution. This variant of the method is advantageous in that it reduces the use of more expensive salts, in addition to reducing the number of resulting intermediate compounds if salts are used, thus being advantageous in that it reduces subsequent washing processes considerably. In this variant of the method, the particle size of the metal cation compounds such as, for example, hydroxides, is not limited, but a maximum recommended particle size is 40 μm, preferably 30 μm, thus ensuring the correct dissolution thereof. Particle size may be achieved by previously grinding the particles of the metal cations following any of the usual processes to this end, such as, for example, grinding in a ball mill.

During step a1) and in case of preparing the dispersion of particles of precursor compounds of the metal cations, dispersing agents may additionally be used such as, for example, polyacrylic acid, in order to facilitate the deagglomeration of particles and the dispersion suspending processes.

The addition of phosphoric acid, in the ratio suitable for the metal phosphate composition to be obtained, to the solution or dispersion of step a), is conducted under stirring until a pH value of <3 is achieved. The ratio of added phosphoric acid may vary with respect to the proportion of metal cations present in a metal cation mol/phosphoric acid mol ratio, in the range of 5:1 up to 1:1.2. The default existence of the proportion of phosphoric acid relative to the proportion corresponding to the metal cations present in the solution ratio is preferably indicated when starting with suspensions of solid particles, for example hydroxides of metal cations, amongst others. This variant of the method is significantly advantageous in that it ensures all of the phosphoric acid is consumed in the reaction. The complete consumption of the phosphate anions in solutions constitutes an important advantage, since it minimizes the treatments needed to neutralise its presence in the residual water resulting from the optional washing processes of the end product. The solution obtained in step a) of the process may be maintained at the selected pH values by adding the selected quantity of phosphoric acid plus another acid, such as hydrochloric acid, amongst others, if necessary. The solution obtained in step a) of the process containing an excess of precursor compounds of the metal cations is also maintained at the desired pH by adding an acid different from phosphoric acid, if a ratio deficient in phosphoric acid is sought. It is recommended that the different reagent additions are carried out keeping the salt solution under intensive stirring or where applicable, the dispersion of the precursor compounds.

The phyllosilicate particles are selected from those materials with laminar, pseudo-laminar or fibrillar structure. The phyllosilicates may be of the 1:1 variety, i.e., composed of a layer of silica tetrahedrons and an octahedral layer of cations, or of the 2:1 variety, composed of two layers of silica tetrahedrons and one central octahedral layer of cations. One example of type 1:1 phyllosilicates is kaolin and examples of type 2:1 phyllosilicates include smectites, including both trioctahedral smectites, wherein the cation of the octahedral layer is mainly magnesium, and dioctahedral smectites, wherein the cation of the octahedral layer is mainly aluminium. One example of dioctahedral smectites is montmorillonite and examples of trioctahedral smectites include saponite and stevensite. All these phyllosilicates have a laminar structure and morphology. In addition to laminar phyllosilicates, pseudo-laminar silicates with a fibrous or acicular structure and morphology may be used. Examples of these pseudo-laminar silicates include sepiolite and attapulgite. The structure of these pseudo-laminar phyllosilicates, the morphology of which is acicular or microfibrous, is formed by two parallel silica chains, bound by oxygen atoms to a central layer of aluminium and/or magnesium octahedrons. These chains composed of silica tetrahedrons are inverted each six units in the case of sepiolite and each four in the case of attapulgite, giving rise to discontinuities in the octahedral layers that generate channels, referred to as zeolitic, oriented in the direction of the c axis of the acicular particles, with dimensions of 3.7×10.6 Å for sepiolite and 3.7×6.4 Å for attapulgite. As a result of this structure, sepiolite and attapulgite adsorb water (zeolitic water) and other compounds (depending on the size and polarity of the molecule) not only on their external surface but also inside the zeolitic channels.

These clays have a high specific surface owing to their elongated habit and are highly porous with a small particle size. The total specific surface (internal and external) of these clays, calculated using theoretical models (C. J. Serna, G. E. Van Scoyoc, in: Mortland, M. M., Farmer, V. C. (eds), Proc. of the Int. Clay Conf., 1978. Elsevier, Amsterdam, 197-206) is approximately 900 $m^2/g$:400 $m^2/g$ of external area and 500 $m^2/g$ of internal area in sepiolite and 300 $m^2/g$ of external area and 600 $m^2/g$ of internal area in attapulgite. However, the surface area of these clays, accessible to the different compounds and adsorbates, depends on the size and polarity thereof, which determine the penetration capacity of the molecules in the clay pores and channels. For example, the BET surface accessible for $N_2$ is above 300 $m^2/g$ in the case of sepiolite and about 150 $m^2/g$ for attapulgite.

These clays have a high density of silanol groups (SiOH) on their outer surface, which originate at the edges of the layers of silica tetrahedrons. These silanol groups are arranged such that they cover the outer surface of these clays and confer a high degree of hidrophylicity thereto, given their ability to adsorb water molecules. These silanol groups may act as active adsorption centres and are able to form hydrogen bridges with different molecules.

In a preferred embodiment of the invention, the phyllosilicate used in step b) is selected from clays or phyllosilicates of the smectite, attapulgite, sepiolite varieties or from mixtures thereof. The smectite phyllosilicate may comprise montmorillonite, saponite and/or stevensite. It must be noted that the phyllosilicate may also be a clay of the bentonite variety. Although the term bentonite is sometimes used incorrectly as a synonym for montmorillonite, the term bentonite does not designate a specific phyllosilicate or mineral species but is rather applied to a rock mainly composed of smectite, which may usually be of the montmorillonite variety.

The preparation of an aqueous suspension of clay-type particles, for example clays of fibrillar morphology such as sepiolite, amongst others, is carried out by means of a process consisting in the dispersion of the phyllosilicate in water at a concentration of 1 to 25% by weight, and preferably between 4% and 12% by weight, using mechanical stirring, preferably at high shear. The average particle size of the phyllosilicate is smaller than 150 microns and preferably smaller than 44 microns. One especially advantageous embodiment of this invention is that in which the particle size of the phyllosilicate is smaller than 5 microns. Phyllosilicates obtained by means of dry or wet grinding processes, usually used to grind and reduce the size of clay particles, for example using impact mills or ball mills, may be used. Products of these clays obtained by special wet micronisation processes, which cause the elemental particles of the clay to separate, without breaking its structure, which also make it possible to expose the external surface thereof to the maximum, may also be used. Examples of these products include sepiolite and attapulgite products of rheological grade, obtained according to the processes described in patents EP0170299, EP0454222 and EP0170299.

The phyllosilicate dispersion is subsequently acidified by adding an acid until the pH of the dispersion is lower than 3, in order to obtain the dispersion of step b). Alternatively, the acid may be added before the phyllosilicate, the phyllosilicate being subsequently dispersed in the aqueous solution of an acid using mechanical stirring, preferably under high shear conditions. The amount of acid added must be enough for the pH of the clay or phyllosilicate dispersion to be lower than 3.

The dispersion of phyllosilicate particles of step b) and the solution of step a) are subsequently mixed, in order to obtain an homogeneous dispersion, using suitable stirring systems, which preferably provide an intense stirring, in order to reduce the time needed to obtain an homogeneous dispersion in step c). An improved process consists in applying a stirring process by means of a high shear method, in order to achieve high homogeneity in this step c).

Subsequently, in step d), a base is added to increase the pH of the mixture up to the value corresponding to the precipitation of the desired phosphate species. The base is usually sodium hydroxide, although other bases such as ammonium hydroxide, potassium hydroxide or lithium hydroxide, for example, may also be used.

The base is added in a controlled manner, keeping the solution of the previous step under stirring, preferably at high shear, in order to prevent excessive increase in local pH, which may lead to the precipitation of undesired phosphate phases. In this step, the inorganic phosphate phase is precipitated in the form of submicrometric or nanometric particles on the surface of the phyllosilicate, originating the hierarchically ordered structures in the aqueous dispersion.

In an optional step e), the hierarchically ordered structures obtained by precipitating the inorganic phosphate on the phyllosilicate may be separated from the solution by means of a solid/liquid separation step. Examples of solid/liquid separation processes include centrifugation or filtration processes using, for example, filtering equipment selected from press filters, pressure band filters, vacuum band filters, rotary vacuum filters and Nucha filters. The resulting product may be washed in order to remove the presence of dissolved reagents in those cases wherein precipitation is not complete. The filtering and washing processes of step e) may be conveniently repeated.

The material obtained as a result of step e) may optionally be treated in the subsequent steps f), g) and h), which may optionally be carried out completely or just partly, depending on the product sought.

In step f), the organofunctionalisation of the surface of the products obtained is carried out by adding an organic modifier agent or coupling agent, in order to improve the compatibility of the hierarchically ordered inorganic phosphate structure on phyllosilicate with different organic matrices. This modification or organofunctionalisation makes it possible to improve the dispersion in the organic matrix, such as a polymer. The organic modifier agent may be an organic compound, demonstrating an amphiphilic character, with one part of the molecule having affinity towards the hydrophilic surface of the phyllosilicate and the other part of the molecule having a hydrophobic character with affinity towards the organic polymer. Examples of this kind of organic modifier include quaternary ammonium salts and quaternary phosphonium salts with alkyl or aryl radicals. They may also be coupling agents capable of reacting on the active sites of the hierarchically ordered structure and with the polymer matrix. Examples of this kind of coupling agent include organosilanes.

The treatment with the organic modifier agent or with the coupling agent may be carried out subsequent to washing and filtering step e) and prior to drying, or preferably in step d) after adjusting the pH for precipitation of the submicrometric or nanometric particles on the surface of the phyllosilicate. This ensures the modifier agents are better distributed when they are added prior to drying, thus preventing the material from agglomerating. The use of high shear velocity dispersion processes during the organo-modification of the products in step f) favours the correct distribution of the modifier or coupling agent. The modification process may optionally be carried out after filtering and washing step e), and prior to drying, by means of intensive mixing of the wet hierarchically ordered structure with the modifier in the ratio required.

The product obtained in step e) and optionally in step f) may be subjected to a drying process in step g), in order to remove excess moisture. This process may be carried out following a standard drying method, using an atmospheric pressure or reduced pressure dryer at temperatures below 300° C., but not limited to said example. One alternative to the solid/liquid separation and drying processes, which improves the yield of step g), is an atomisation drying process, for drying the suspension obtained in step d).

The dry product may optionally be ground, in an optional step h), or dry conditioned, in order to adapt it to the different application requirements. For example, in order to obtain a product, the particle size or apparent density of which is suitable for the packaging, transportation, handling and dosage thereof. Should grinding the end product be desired, simultaneous grinding/drying systems may be used, in an optional step i), using impact mills that facilitate simultaneous drying by injecting hot gases into the grinding chamber, as an alternative to drying and grinding steps g) and h). The final particle size may be selected by means of static or dynamic sorting systems.

The product resulting from the present invention method is characterised in that it is a hierarchically ordered structure of submicrometric or nanometric amorphous and hydrated inorganic phosphate particles, supported on phyllosilicate particles, with a low agglomeration state. Phyllosilicate particles are especially advantageous for obtaining these ordered structures with homogenously distributed submicrometric or nanometric inorganic phosphate particles, supported on the surface of the phyllosilicate, since these phyllosilicate particles have a high specific surface, which favours heterogeneous nucleation processes. The submicrometric or nanometric inorganic phosphate particles thus present a low agglomeration state and are distributed homogeneously on the surface of the phyllosilicate.

The final pH of step d) will be determined by the inorganic phosphate species to be obtained on the phyllosilicate in the hierarchically ordered structure and by the nature of the phosphate precursor compounds of the phosphates. The product obtained is characterised in that it is an amorphous product and has hydration water within its structure. The resulting product is also characterised in that the inorganic phosphate particles are submicrometric in size, measuring less than 1 micron and are preferably nanometric, measuring less than 100 nanometers. These nanoparticles are dispersed as individual particles or as nanoparticle agglomerates or mixtures of both. Where appropriate, the nanoparticle agglomerates are smaller than 400 nm, preferably measuring less than 200 nm. The inorganic phosphate particles are supported on the phyllosilicate particles forming a hierarchical order. Obtaining submicrometric or nanometric phosphate particles is a known process, although it is characterised by the high agglomeration state thereof. The method described in the present invention proves advantageous given the high dispersion degree and low agglomeration degree of the inorganic phosphate particles obtained. One additional advantage is that said inorganic phosphate particles are homogeneously distributed and supported hierarchically on larger particles, which constitute the phyllosilicate particles used as support.

In the method carried out in the present invention, the phyllosilicate particles keep their morphology. In the method conducted, the dispersion of the phyllosilicate particles is kept even after drying the same, owing to the presence of submicrometric or nanometric inorganic phosphate particles on its surface, which prevent the re-agglomeration of the phyllosilicate particles. This process, as will be further described, constitutes an additional advantage, since it favours dispersion processes for the hierarchically ordered structures in different matrices.

The product optionally obtained in step f) is characterised in that it is a hierarchically ordered structure of amorphous and hydrated submicrometric or nanometric inorganic phosphate particles, with a low agglomeration state, supported on the phyllosilicate particles, the surface of which is coated with an organic modifier agent or coupling agent, which makes the hierarchically ordered structure compatible with matrices of an organic nature such as a polymer matrix, for example.

The resulting product may be prepared by starting with an excess of precursor compounds of metal cations or a molar excess of the metal cation solution previously prepared. The result is the product previously described, in addition to the excess presence of the metal cation compounds. In the present invention, a significant reduction in the size of the inorganic phosphate particles is obtained when there is an excess of metal salts, relative to phosphoric acid. Said reduction in size is produced as a result of a combined effect of the high shear stirring processes and the use of acid solutions. An additional advantage of using an excess of metal cations precursor compounds is, as previously mentioned, the elimination of the washing processes, since no intermediate compounds are produced in said method and the different cations are removed from the solution.

In a preferred embodiment, submicrometric or nanometric particles of aluminium phosphate salts (aluminium phosphate, monobasic aluminium phosphate and dibasic aluminium phosphate) are obtained by using a solution of aluminium sulphate, phosphoric acid and a suspension of acicular sepiolite particles, according to the processes conducted in steps a), b), c), d), e), f) and i). The final ratio by weight of aluminium phosphate precursor particles and sepiolite may range from 70 parts by weight of aluminium phosphates and 30 parts by weight of sepiolite to 30 parts by weight of aluminium phosphates and 70 parts by weight of sepiolite. The composition of this hierarchical structure of aluminium phosphates and sepiolite is preferably composed of from 60 parts by weight of aluminium phosphates and 40 parts by weight of sepiolite to 40 parts by weight of aluminium phosphates and 60 parts by weight of sepiolite. An especially advantageous embodiment is that composed of 50 parts by weight of monobasic aluminium phosphate and 50 parts by weight of sepiolite.

The dry powder composed of a hierarchically ordered structure of submicrometric or nanometric aluminium phosphate particles dispersed and supported on acicular sepiolite particles may be shaped by pressing, for example uniaxial pressing or may be used as a coating on a substratum, to that end using a carrier such as turpentine oil, for example, although not limited to these examples.

A thermal treatment of above 300° C. produces a loss of hydration water in the aluminium phosphates and also gives rise to the polymerisation of the phosphates. This process is characterised in that it absorbs energy, thus being an endothermic process. The removal of hydration water proves favourable in flame retardant processes. Polymerisation processes prove favourable in terms of increasing the integrity of the hierarchical structure formed by the submicrometric or nanometric aluminium phosphate and acicular sepiolite particles. The condensation and polymerisation of hydrated aluminium phosphate particles on the surface of the sepiolite leads to the formation of bonds between acicular sepiolite particles in the contact sites between sepiolite particles coated with submicrometric or nanometric phosphate particles. When phosphate particles coating different sepiolite acicular particles or fibrils react and are condensed, thus forming polyphosphates, a thermal treatment of up to 900° C. favours the formation of a nanometric coating on the sepiolite fibrils, by means of the aluminium phosphates. The structure formed during the thermal treatment is characterised in that it forms a three-dimensional structure, wherein the aluminium phosphate particles coat the sepiolite acicular particles, thus forming bonds between the different coated fibrils. This three-dimensional structure is characterised in that it presents connectivity between the coated acicular particles and keeps a homogeneously distributed and interconnected porosity. The mechanical strength of said material increases relative to a material in which said connectivity is not produced.

The hierarchically ordered structure of the present invention may be mixed with other particles, such as nanoparticles, of organic or inorganic materials. The mixture may be prepared using physical, dry or wet methods. The mixtures are made with the purpose of subsequent heat treatments giving rise to a material by means of a reaction between the components, once the material has been shaped into one piece. Said reaction is characterised in that it makes it possible to remove the volatile elements during heating, owing to the homogeneously distributed porosity. The material or compact piece keeps its integrity owing to the polymerisation of phosphate particles after the same has been subjected to a dehydration process and may finally react with the components added. In a particular embodiment, the reaction with the components added may form a liquid phase and will form a continuous matrix by reaction. A partial fusion, for example of the aluminium phosphate with alkaline cations that come from the phyllosilicate or that have been added to favour the formation of the liquid phase, may occur at a specific temperature.

A variant of the processes above comprises the use of different inorganic metal cations in step a), in order to form the corresponding inorganic metal phosphates, for example, starting with iron and aluminium salts, such as iron sulphate and aluminium sulphate. Either iron and aluminium phosphates or solid phosphate solutions of aluminium iron-phosphate solutions, supported on phyllosilicate nanoparticled systems, may thus be obtained. The method described is not limited to the previous examples.

The dry product obtained in a preferred embodiment comprising step f) is characterised in that the product may be incorporated directly into thermoplastics, by means of melt-mixing. This powdered product obtained in the process including step f) may also be incorporated into a thermosetting polymer before the polymerisation step of the thermosetting compound or it may be dispersed within the corresponding monomers prior to in situ polymerisation, in order to obtain the corresponding polymer, so as to obtain a homogeneous dispersion of the hierarchically ordered structure of inorganic phosphates on phyllosilicates. The nanometric character of the inorganic phosphate particles and the low agglomeration state thereof, upon being supported on phyllosilicate particles, facilitate the homogeneous distribution of the same in the polymer matrix during the melt-mixing or dispersion process acting on the monomers prior to polymerisation.

One characteristic of the hierarchically ordered structures obtained by this method consists in that after the incorporation thereof into a polymer matrix, for example, an ethylene-vinyl acetate (EVA) copolymer, although not restricted to this compound, in a ratio comprised between 3 and 50% by weight, the final compound consists of a nanocompound, wherein the product formed by hierarchically ordered inorganic phosphate structures on phyllosilicates is dispersed in the polymer matrix. The polymer nanocompound containing the product dispersed thus acquires flame retardant characteristics, characterised in that the reaction facilitates the formation, with temperature, of a hierarchical nanometric structure of phyllosilicate particles, preferably fibrils of pseudo-laminar silicates such as sepiolite, interlinked by the inorganic metal polyphosphate particles. This net acts as a backbone, which facilitates the gradual burning of the organic component of the nanocompound, thus meaning more time is required for the nanocomposite to burn completely, when compared to a nanocompound into which the hierarchical ordered structure of metal inorganic phosphates on phyllosilicates has not been incorporated.

Additionally, as a result of the existence of said hierarchically ordered, interlinked net of nanometric fibres previously described, the resulting ashes produced after the polymer burning process present a high consistency. The incorporation of the product obtained by the method of the present invention gives rise to an increase of the force required to break the resulting ashes of at least one order of magnitude in said force, with respect to a nanocomposite that only contains phyllosilicate. Table 1 in example 5 indicates the force required to break the resulting ash.

One characteristic of the hierarchically ordered structure of metal phosphates on phyllosilicates is that the interconnection by means of the formation of metal polyphosphates thereof is produced simultaneously to the organic matrix burning process, acting as flame retardant and conferring mechanical properties to the resulting ash. This process becomes a unique advantage over other flame retardants, since it makes it possible to achieve significant consistency in the ashes, as of the moment in which polymer matrix loss occurs. For example, in the case of the preferred embodiment of aluminium phosphate supported on sepiolite, when it is incorporated into an EVA matrix, consistent ashes are obtained in a wide range of temperatures. This characteristic thus becomes an additional advantage over other compositions, which require a high temperature melting or ceramifying phase to be incorporated.

Other polymer matrices, into which the hierarchically ordered structure of metal phosphates on phyllosilicates may be incorporated, in order to provide them with flame retardant and ceramifying characteristics comprises thermoplastic homopolymers and copolymers, selected from the group of polyamide 6, polyamide 66, polyamide 12, polyesters, polyethylene terephthalate, polypropylene terephthalate, polybutylene terephthalate, polypropylene, polyethylene, polybutylene, polyoxymethylene, vinyl polyacetate, polymethacrylates, thermoplastic polyolefins, polycarbonate, acrylonitrile-butadiene-styrene, polycarbonate, ethylene vinyl-acetate and polystyrene, and any combination thereof. The polymer matrix may also be a thermosetting polymer compound, comprising at least one polymer selected from the group consisting of unsaturated polyesters, saturated polyesters, polyurethanes, epoxy resins, phenol-formaldehyde resins, urea-formaldehyde resins, melamine-formaldehyde resins, bismaleimides, polyimides and acrylic resins and any combination thereof.

The hierarchically ordered structure of the present invention is likewise characterised in that is synergistic with other flame retardant fillers of the nano- or micrometric variety, such as aluminium hydroxide, for example, although not restricted to this compound. Said synergy is characterised by improved flame retardant response and particularly by the fact that the resulting ashes, in addition to maintaining the strength required for the mechanical breakage thereof, remain intact as one piece and thus do not become detached after the burning assays.

The present invention also relates to a hierarchically ordered structure of submicrometric or nanometric phosphate particles of at least one inorganic cation homogeneously deposited on the surface of a phyllosilicate. The inorganic phosphate cation may be selected from the group comprising Al, Zn, Cd, Fe, Sn, Mn, Ni, Co, B, Sb, W, Mo, Zr, Cu, Ga, In, Be, Mg, Ca, Sr, Ba, $NH_4OH$, Li, Na, K, Rb, Cs and mixtures thereof.

In said hierarchically ordered structure of submicrometric or nanometric particles, the phyllosilicate is preferably a type 2:1 phyllosilicate of laminar or acicular morphology, the phyllosilicate more preferably being type 2:1 and a dioctahedral smectite, trioctahedral smectite, sepiolite, attapulgite or a mixture thereof.

The smectite is preferably of the montmorillonite, saponite, stevensite, beidellite, nontronite or hectorite variety or a mixture thereof.

The weight ratio of inorganic phosphate and phyllosilicate in the hierarchically ordered structure may range from 70 parts by weight of inorganic phosphate and 30 parts by weight of phyllosilicate, to 30 parts by weight of inorganic phosphate and 70 parts by weight of phyllosilicate, preferably ranging from 60 parts by weight of inorganic phosphate and 40 parts by weight of phyllosilicate and 40 parts by weight of inorganic phosphate and 60 parts by weight of phyllosilicate.

The phyllosilicate particles have an average size smaller than 150 micrometers, preferably, an average particle size smaller than 45 micrometers and more preferably still, are smaller than 10 micrometers.

The inorganic phosphate particles precipitated and supported on the phyllosilicate are less than 1 micrometer in size and preferably smaller than 100 nanometers in size.

The particles of the hierarchically ordered structure are optionally bound to an organic modifier or coupling agent, giving rise to a modified hierarchically ordered structure.

The organic modifier agent used to obtain a modified hierarchically ordered structure, may be selected from the group consisting of quaternary ammonium salts, quaternary phosphonium salts, polyaminates, polyglycols, silicon oils, polydimethylsiloxanes, organo-metal compounds, amines and polyamines and any combination thereof.

The organo-metal compound may be selected from the group consisting of:
  organo-silanes, preferably, 3-aminopropyl triethoxy silane, 3-aminopropyl trimethoxy silane, vinyltriethoxy silane, vinyltrimethoxy silane, 3-methacryloxipropyl trimethoxy silane, methyltrimethoxy silane, methyl triethoxysilane, 3-mercaptopropyl trimethoxy silane, tetraethoxy silane, n-octiltrimethoxy silane, n-octyltriethoxy silane, n-hexadecyl trimethoxy silane, N-2-aminoethyl-3-aminopropyl trimethoxy silane, 3-glycidyloxypropyl trimethoxy silane, alkylamine trimethoxysilane, acryloxypropyl trimethoxy silane, N-(2-aminoethyl)-3-aminopropyl-methyl dimethoxy silane, ketiminopropyl triethoxy silane, 3,4-epoxycyclohexylethyl trimethoxy silane and aminopropyl trimethoxy silane,
  organo-titanates,
  organo-zirconates
  and any combination thereof.

The quaternary ammonium salt may be selected from the group consisting of: trimethyl alkyl ammonium, dimethyl benzyl alkyl ammonium, dimethyl dialkyl ammonium, methyl benzyl dialkyl ammonium, dimethyl alkyl 2-ethylhexyl ammonium and methyl alkyl bis-2-hydroxyethyl ammonium salts, wherein the alkyl chain has at least 12 carbon atoms, which are either synthetic or of natural origin, such as tallow or hydrogenated tallow; the phosphonium salt being selected from the group consisting of trihexyl(tetradecyl)phosphonium, tributyl(tetradecyl)phosphonium, tetrabutyl phosphonium and tetra-n-octyl phosphonium salts.

The inorganic phosphate precipitated and supported on the phyllosilicate in the hierarchically ordered or modified hierarchically ordered structure may be selected, according to particular embodiments, from the group consisting of:
  aluminium phosphate,
  monobasic aluminium phosphate,
  dibasic aluminium phosphate
  and any combination thereof.

According to particular embodiments, the phyllosilicate of the hierarchically ordered or modified hierarchically ordered structure is sepiolite.

According to further particular embodiments, the phosphate ratios of aluminium/sepiolite in the hierarchically ordered structure or in the modified hierarchically ordered structure, is 50:50 by weight.

According to further particular embodiments, the modified hierarchically ordered structure that comprises aluminium/sepiolite phosphates with a 50:50 weight ratio, is superficially modified with a quaternary ammonium salt.

According to further particular embodiments, the modified hierarchically ordered structure comprises a quaternary ammonium salt, which is a dimethyl di(hydrogenated tallow) ammonium salt. The percentage of dimethyl di(hydrogenated tallow) ammonium salt is preferably between 10% and 30% by weight with respect to the weight of the hierarchically ordered structure of aluminium/sepiolite phosphates.

The hierarchically ordered or modified hierarchically ordered structure may be mixed with other organic or inorganic material particles, using dry or wet physical methods.

The present invention also relates to a hierarchically ordered structure of submicrometric or nanometric particles or to a modified hierarchically ordered structure, of inorganic phosphates homogeneously deposited and supported on the surface of a phyllosilicate obtained by the method described in the present specification.

The present invention also relates to a composition comprising the hierarchically ordered structure of submicrometric or nanometric particles or the modified hierarchically ordered structure described in the present specification.

Said composition may comprise one or more polymers, which may be thermoplastics, thermosetters or elastomers.

According to particular embodiments, the composition comprises between 2% and 40% by weight of the hierarchically ordered or modified hierarchically ordered structure, and preferably between 4% and 25% by weight of the hierarchically ordered or modified hierarchically ordered structure.

The present invention also relates to the use of the hierarchically ordered or modified hierarchically ordered structure, or of a composition comprising the same, to provide the organic materials, especially polymeric and elastomeric materials, with flame resistant and ceramification properties in the event of fire.

EXAMPLES

Example 1

Hierarchically Ordered Structure of Monobasic Hydrated Aluminium Phosphate Particles on Acicular Sepiolite Particles A product composed of a hierarchically ordered structure of monobasic hydrated aluminium phosphate particles on acicular sepiolite particles is obtained. To this end, the following process is followed:

a) 210 g of Al(OH)$_3$ are dissolved in 1550 g of H$_3$PO$_4$ (51% purity), thus giving a molar Al/P ratio of 1:3. The dispersion is kept under stirring until the Al(OH)$_3$ dissolves completely in the H$_3$PO$_4$.

b) 1000 g of a sepiolite rheological product obtained according to the process described in Patent EP0170299 are dispersed in 9000 g of distilled H$_2$O and the same is stirred for 3 minutes in a toothed disk stirrer of the Cowles variety with a 13 cm diameter, at a speed of 1500 rpm, equivalent to a peripheral speed of 10.2 m/s. A pre-dispersion is thus obtained at a concentration of 10%. Another 428 g of distilled H$_2$O are then added and the same is stirred at 2000 rpm for 5 minutes, in order to obtain a dispersion with a final sepiolite concentration of 7% by weight. HCl is subsequently added to the sepiolite dispersion, up to a final pH of 2 and is kept under stirring for 10 minutes.

c) The solution of Al(OH)$_3$ in H$_3$PO$_4$ obtained in step a) is added to the sepiolite suspension obtained in step b)

d) A saturated solution of NH$_4$OH is then slowly added to the dispersion obtained in step c) under stirring, until a pH=5 is reached. The monobasic hydrated aluminium phosphate is precipitated on the acicular sepiolite particles at this pH, thus forming the hierarchically ordered structure of monobasic hydrated aluminium phosphate on sepiolite.

e) The dispersion of the hierarchically ordered structure obtained in step d) is vacuum filtered and washed with 1500 ml of distilled H$_2$O.

f) The filter cake obtained in e), with an approximate humidity of 60%, is dried in an oven at 60° C. and deagglomerated in an impact mill, in order to obtain the final powdered product. This product is composed of the hierarchically ordered structure of hydrated aluminium phosphate nanoparticles supported and dispersed on acicular sepiolite particles with a sepiolite/aluminium phosphate ratio of 50:50 by weight.

Figure 1:
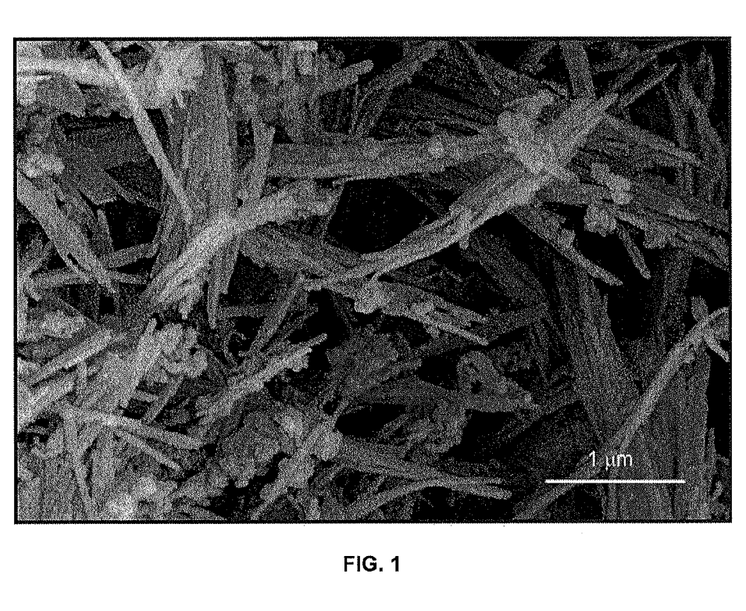
FIG. 1. Field-Emission Scanning Electron Microscopy micrograph of a product obtained by following Example 1 of the present invention.
Figure 3:
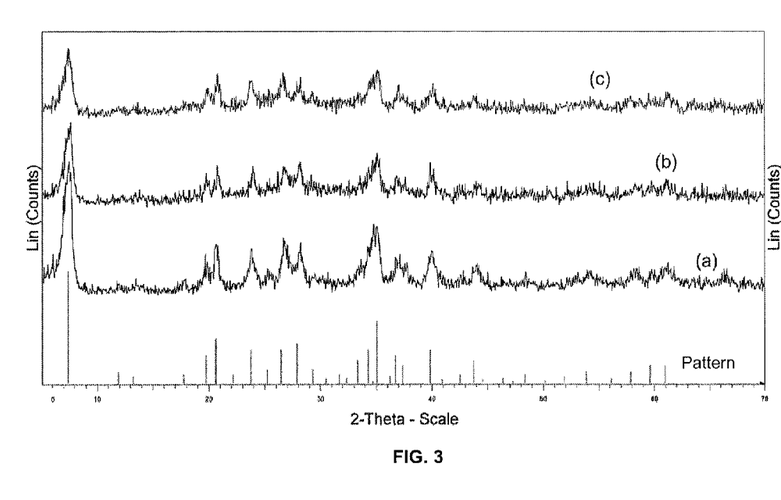
FIG. 3. X-Ray Diffraction Diagrams of: a) Sepiolite used in the preparation of the products described in Examples 1, 2 and 3, b) the product obtained in Example 1 of the present invention and c) the product obtained in Example 2 of the present invention. The main x-ray diffraction standard curves corresponding to the sepiolite structure are indicated.
Figure 4:
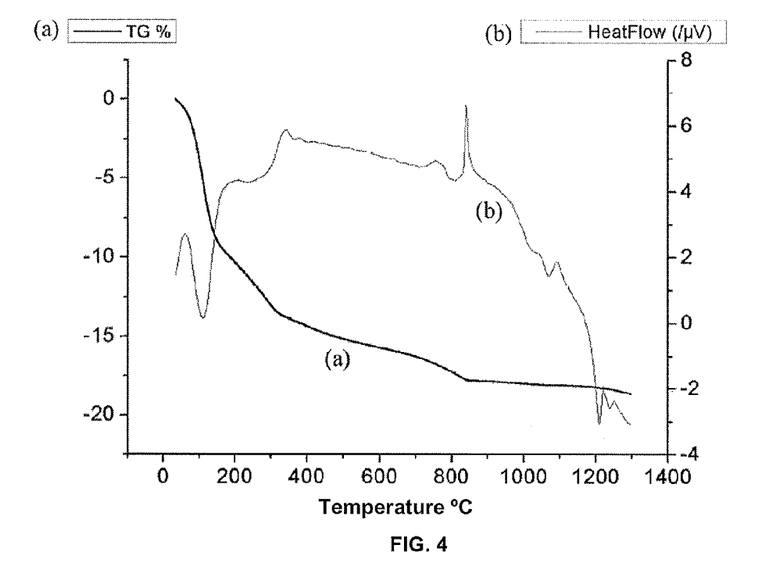
FIG. 4. Thermogravimetric and differential thermal analysis (TG-DTA) of the product obtained in Example 1 of the present invention.

The product obtained was observed under Electron Microscopy (FIG. 1), wherein it is possible to observe the nanoparticles of the monobasic aluminium phosphate precursor supported on sepiolite nanofibers. The thermo differential and thermogravimetric analysis of the product obtained is also shown in FIG. 4. The X-Ray diffraction diagram (FIG. 3*b*) only shows the peaks corresponding to the crystalline sepiolite structure, confirming the lack of crystallinity in the nanoparticles of the monobasic hydrated aluminium phosphate precursor.

Example 2

Figure 2:
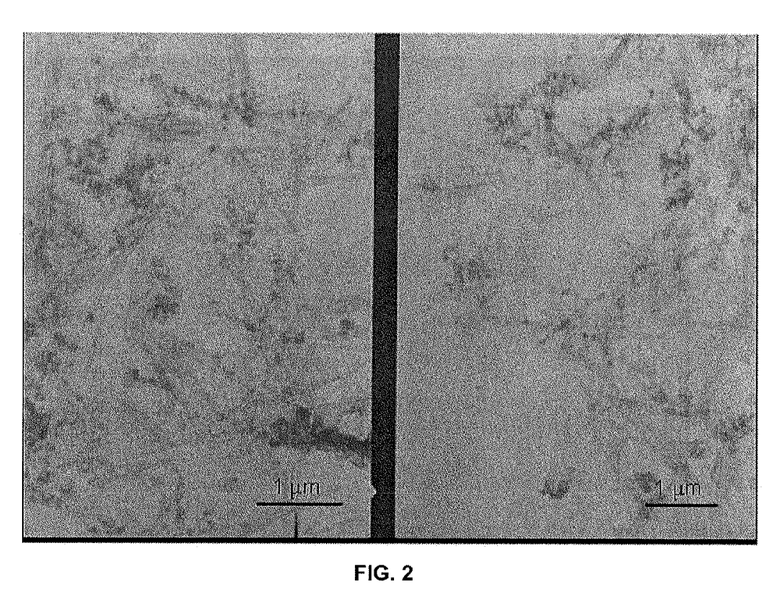
FIG. 2. Transmission Electron Microscopy micrographs of a product obtained by following Example 2 of the present invention.

Hierarchically Ordered Structure of Monobasic Hydrated Aluminium Phosphate Nanoparticles on Organically Modified Acicular Sepiolite Particles 20% by weight of a quaternary ammonium salt was added as modifier agent to the wet filtration cake obtained by following steps a) and e) of the method described in Example 1. The quaternary ammonium salt used was dimethyl di(hydrogenated tallow) ammonium chloride and the percentage by weight refers to the dry weight of the hierarchically ordered structure of hydrated aluminium phosphate particles on acicular sepiolite particles. The mixture was prepared in an intensive Lodige type mixer with plough shaped blades, for 10 minutes. The product obtained was then dried in an oven at 60° C. and was deagglomerated in a laboratory impact mill. A hierarchically ordered structure of monobasic hydrated aluminium phosphate on organically modified sepiolite is thus obtained, in order to facilitate the dispersion thereof in polymer matrices. The product obtained was observed under Electron Microscopy (FIG. 2), wherein the monobasic aluminium phosphate precursor nanoparticles supported on sepiolite nanofibers are observed. The X-Ray diffraction diagram (FIG. 3*c*) just shows the peaks corresponding to the sepiolite crystalline structure, which also confirms that, in this case, the lack of crystallinity of the monobasic hydrated aluminium phosphate precursor nanoparticles.

Example 3

Hierarchically Ordered Structure of Monobasic Hydrated Aluminium Phosphate Nanoparticles on Acicular Sepiolite Particles Obtained Using NaOH as a Precipitant A product is obtained by following the process described in Example 1, the difference being that in step d) rather than using NH$_4$OH, 25% NaOH is used as a precipitant agent, in order to adjust the pH to 5. The resulting product is filtered and washed in step e) until the Na content in the final product is 3%. A hierarchically ordered structure of hydrated monobasic aluminium phosphate on modified sepiolite is thus obtained, with a sepiolite/aluminium phosphate ratio of 50:50 by weight, containing 3% Na.

Figure 8:
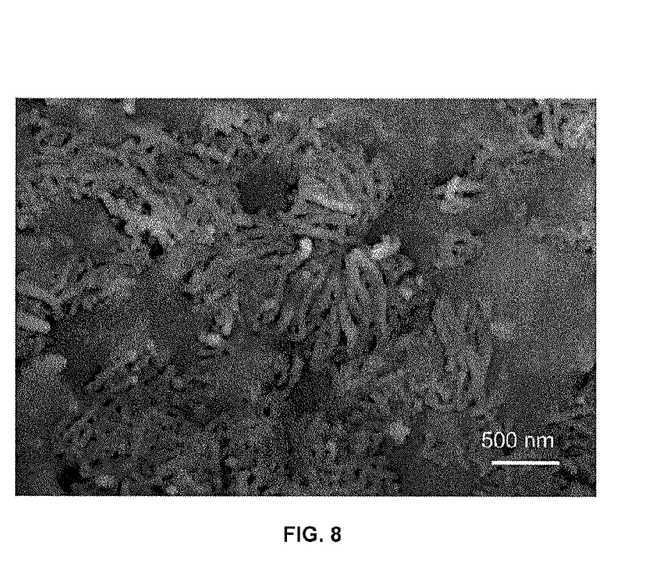
FIG. 8. Field-Emission Scanning Electron Microscopy micrograph of the product obtained by following Example 3, which has been thermally treated at 900° C. for 5 minutes.

This product is shaped by means of uniaxial pressing and is heated at 900° C. The corresponding ashes were observed under Electron Microscopy (FIG. 8). It is possible to observe that the ashes are characterised in that they preserve the morphology of the acicular sepiolite particles embedded in a continuous vitreous matrix.

Example 4

Hierarchically Ordered Structure of Dibasic Iron Phosphate Nanoparticles on Acicular Sepiolite Particles A hierarchically ordered structure of dibasic iron phosphate on acicular sepiolite particles is obtained. To this end, the following process is followed:

a) 430.8 g of $Fe_2O_3$ are dissolved in 1550 g of $H_3PO_4$ (51% of purity), thus giving rise to a final molar Fe/P ratio of 2:3. The dispersion is kept under stirring until the $Fe_2O_3$ has dissolved completely in the $H_3PO_4$.

b) 1000 g of a rheological sepiolite product obtained according to the method described in Patent EP0170299 are dispersed in 9000 g of distilled $H_2O$ and stirred for 3 minutes in a Cowles type toothed disk stirrer with a 13 cm diameter, at a speed of 1500 rpm, equivalent to a peripheral speed of 10.2 m/s. A pre-dispersion at a concentration of 10% is thus obtained. Another 428 g of distilled $H_2O$ are then added and the same is stirred at 2000 rpm for 5 minutes, in order to obtain a dispersion with a final sepiolite concentration of 7% by weight concentration. HCl is then added to the sepiolite dispersion until a final pH of 2 is reached and is kept under stirring for 10 minutes.

c) The $Fe_2O_3$ in $H_3PO_4$ solution obtained in step a) is added to the sepiolite suspension obtained in step b).

d) A saturated $NH_4OH$ solution is then added, as quickly as possible, to the dispersion obtained in step c) under stirring until a pH of 10 is reached. At this pH, the dibasic iron phosphate is precipitated on the acicular sepiolite particles, the hierarchically ordered structure of dibasic iron phosphate on sepiolite thus being formed.

e) The dispersion of the hierarchically ordered structure obtained in step d) is vacuum filtered and washed with 1500 ml of distilled $H_2O$.

f) The filtration cake obtained in e) with an approximate humidity of 60% is dried in an oven at 60° C. and deagglomerated in an impact mill, in order to obtain the final powdered product. This product is composed of the hierarchically ordered structure of dibasic iron phosphate nanoparticles supported and dispersed on the acicular sepiolite particles.

Example 5

Thermal Behaviour of the Hierarchically Ordered Structure of Nanoparticles of Monobasic Aluminium Phosphate on Sepiolite With the aim of determining the strength of the material obtained following thermal treatment, the product obtained in Example 2 was compacted and treated at 500° C. and 900° C. for 5 minutes. The breaking strength of the ashes was subsequently determined and the same were observed under Electron Microscopy. The sepiolite product used as a starting material for obtaining the hierarchically ordered structure of Example 2 was used as a control. The results (Table 1) show that the ashes obtained with the hierarchically ordered structure are significantly more resistant than the starting sepiolite.

TABLE 1

| Force for breaking the ashes resulting after the thermal treatment: | | | |
|---|---|---|---|
| Sepiolite (% by weight) | Product obtained in Example 2 (% by weight) | Thermal treatment (° C.) | Ash breaking strength (Kg/cm2) |
| 100 | | 900 | 5 |
| | 100 | 500 | 21 |
| | 100 | 900 | 49 |

Figure 5:
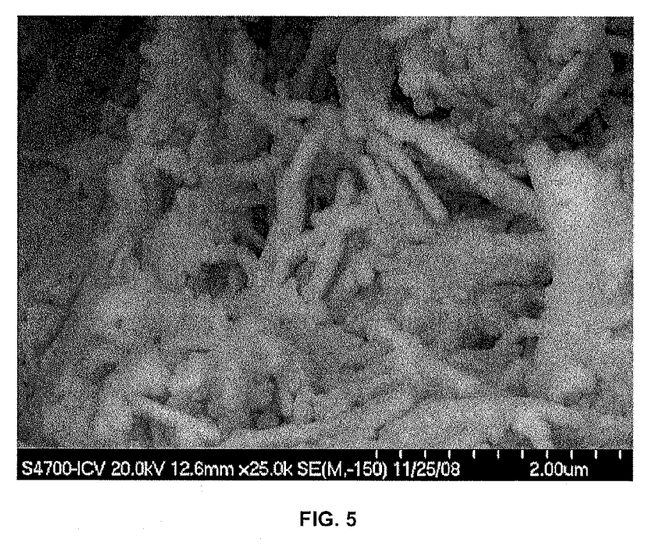
FIG. 5. Field-Emission Scanning Electron Microscopy micrograph of the product obtained following Example 2 of the present invention, which has been thermally treated at 500° C. for 5 minutes.
Figure 6:
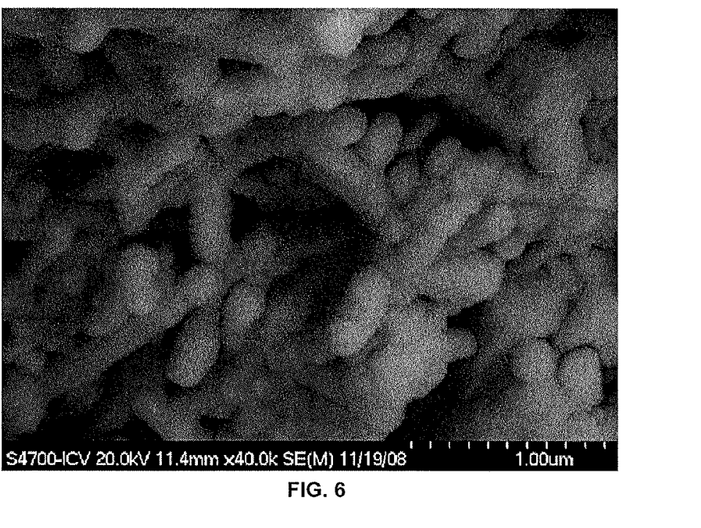
FIG. 6 Field-Emission Scanning Electron Microscopy micrograph of the product obtained following Example 2 of the present invention, which has been thermally treated at 900° C. for 5 minutes.
Figure 7:
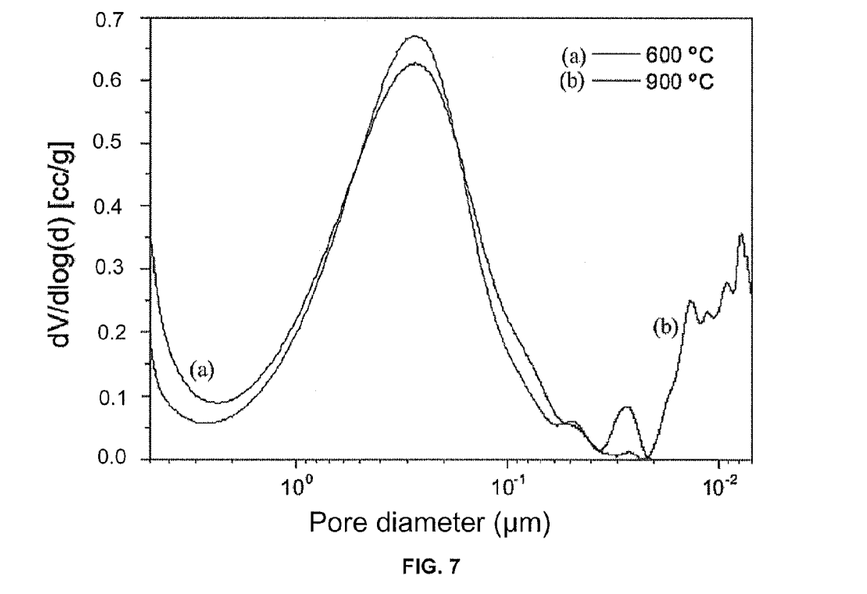
FIG. 7. Pore size distribution of the ashes of the product obtained following Example 2 of the present invention, which has been thermally treated for 5 minutes at 600° C. and 900° C., respectively.

The microstructures of the resulting ashes are shown in FIGS. 5 and 6. It is possible to observe that the product treated at 500° C. is characterised in that it presents consistent ashes in acicular particles or sepiolite fibres, coated with condensed aluminium phosphate nanoparticles, thus forming a hierarchically ordered structure characterised in that it connects fibres together and explains the increase in mechanical strength. The product treated at 900° C. is characterised in that it presents consistent ashes in acicular particles or sepiolite fibres, coated with crystallised aluminium phosphate nanoparticles, with a cristobalite structure, thus forming a hierarchically ordered structure, which connects fibres together and has high mechanical strength. As can be seen in FIG. 7, wherein the distribution of the pore size of the ashes is shown, the same are characterised in that they have an open, interconnected submicrometric porosity, subsequent to thermal treatment.

Example 6

Hierarchically Ordered Structure of Monobasic Aluminium Phosphate Nanoparticles on Sepiolite as a Flame Retardant and Ceramifyinq Additive in EVA The product obtained in Example 2 was incorporated into an EVA polymer by means of melt-mixing, at a concentration of 12% to 40% by weight, with or without 47% by weight of aluminium hydroxide, in order to obtain a nanocompound of the hierarchically ordered structure in EVA. After burning the polymer in a calorimetric cone, the breaking strength on the resulting ashes was determined. The results (Table 2) show that adding the hierarchically ordered structure obtained in Example 2 increases the mechanical strength of the ashes very significantly.

TABLE 2

| Force for breaking the ashes resulting from burning nanocompounds in EVA in the calorimetric cone assay. | | | | |
|---|---|---|---|---|
| EVA (% by weight) | Sepiolite (% by weight) | Product obtained in Example 2 (% by weight) | Aluminium hydroxide (% by weight) | Ash breaking strength (Kg/cm2) |
| 88 | 12 | | | 3 |
| 41 | 12 | | 47 | 4 |
| 88 | | 12 | | 23 |
| 41 | | 12 | 47 | 45 |
| 60 | | 40 | | 105 |

Example 7

Figure 9:
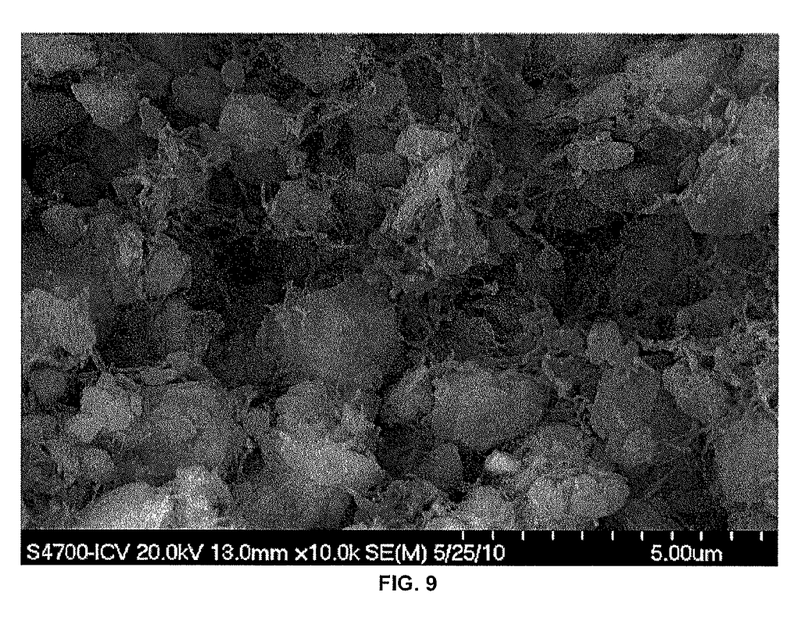
FIG. 9. Field-Emission Scanning Electron Microscopy micrograph of the ashes obtained after thermal treatment at 900° C. for 5 minutes of the nanocompound in EVA of the hierarchically ordered structure obtained following Example 2 of the present invention, as described in Example 7.

Microstructure of the Nanocompound Ashes of the Hierarchically Ordered Structure of Monobasic Aluminium Phosphate Nanoparticles on Sepiolite in EVA The product obtained in Example 2 was incorporated into an EVA polymer by means of melt-mixing, in order to obtain a nanocompound composed as follows: 12% by weight of the product obtained in Example 2, 43% by weight of EVA and 45% by weight of aluminium hydroxide microparticles. The resulting nanocompound was treated thermally at 900° C. for 5 minutes and the resulting ashes were observed under Electron Microscopy (FIG. 9). It is possible to observe that these ashes are characterised in that they contain acicular sepiolite particles coated with aluminium phosphate nanoparticles, thus forming a hierarchically ordered structure and being organised in a three-dimensional net, characterised in that it connects fibres together and contains the gamma-aluminium particles derived from the initial aluminium hydroxide particles.

Example 8

Figure 10:
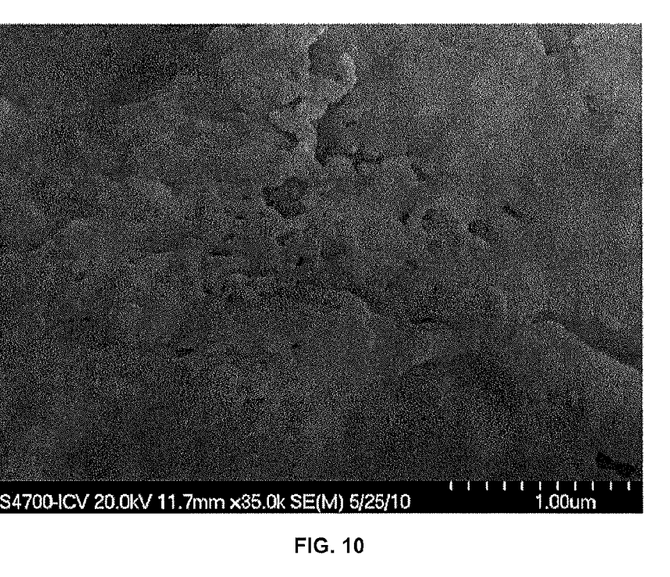
FIG. 10. Field-Emission Scanning Electron Microscopy micrograph of the ashes obtained after thermal treatment at 900° C. for 5 minutes of the nanocompound in EVA of the hierarchically ordered structure obtained following Example 2 of the present invention, as described in Example 8.
Figure 11:
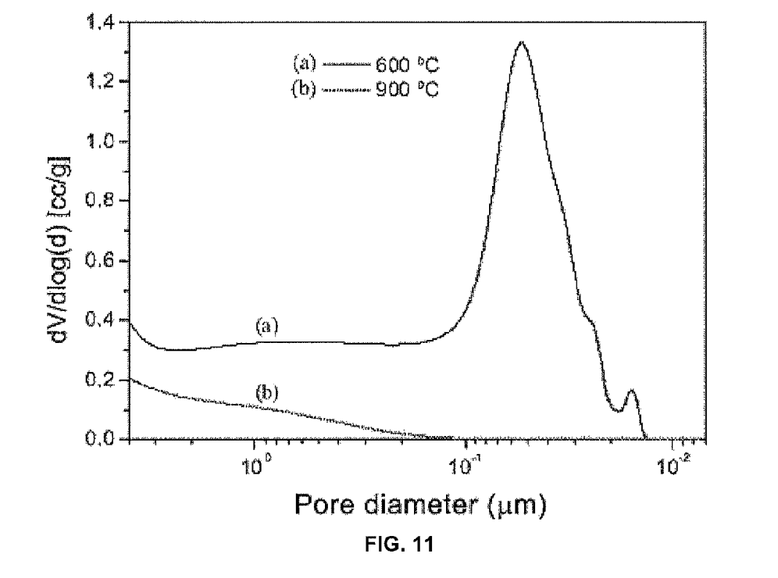
FIG. 11. Pore size distribution of the ashes after thermal treatment at 600° C. and 900° C. for 5 minutes of the nanocompound in EVA of the product obtained by following Example 2 of the present invention, as described in Example 8.

Microstructure of the Nanocompound Ashes of the Hierarchically Ordered Structure of Monobasic Aluminium Phosphate Nanoparticles on Sepiolite in EVA The product obtained in Example 2 was incorporated into an EVA polymer by means of melt-mixing, in order to obtain a nanocompound composed as follows: 40% by weight of the product obtained in Example 2 and 60% by weight EVA. The resulting nanocompound was treated thermally at 900° C. for 5 minutes and the resulting ashes were observed under Electron Microscopy (FIG. 10). It is possible to observe that these ashes are characterised in that they have a continuous matrix without interconnected porosity, thus producing a material that may be ceramified. The study on the pore size distribution of the ashes subsequent to treatment at 600° C. and 900° C. (FIG. 11) shows that these ashes are characterised in that they have an open, interconnected nanometric porosity at 600° C., which is closed at 900° C. and confirms the ceramifiable material character thereof.

The invention claimed is:

1. A method for preparing hierarchically ordered structures of inorganic phosphate particles, homogenously deposited on the surface of a phyllosilicate, wherein the method comprises the following steps:
   a) obtaining an acid solution of precursor compounds of an inorganic phosphate,
   b) preparing a dispersion of particles of a phyllosilicate in aqueous medium and acidifying the phyllosilicate dispersion by adding at least one acid, thereby obtaining an acid dispersion,
   c) mixing the acid solution obtained in step a) with the dispersion obtained in step b)
   d) with stirring, adding a base to the mixture obtained in step c) until the pH value required for precipitating the corresponding inorganic phosphate on the phyllosilicate particles is achieved, resulting in a hierarchically ordered structure of homogenously distributed submicrometric or nanometric inorganic phosphate particles, supported on the phyllosilicate surface.

2. The method according to claim 1, wherein the acid solution of the precursor compounds of an inorganic phosphate is obtained by dissolving the precursor compound of at least one cation in an acid solution comprising at least phosphoric acid.

3. The method according to claim 1, wherein the acid solution of the precursor compounds of an inorganic phosphate according to step a) is obtained by means of:
   a1) precipitating a solution or dispersion of a compound of at least one precursor cation of the inorganic phosphate, and
   a2) adding an acid solution comprising at least phosphoric acid to the solution or dispersion prepared in step a1).

4. The method according to claim 1, which further comprises the following step after step d):
   e) separating the hierarchically ordered structure of homogenously distributed submicrometric or nanometric inorganic phosphate particles, supported on the phyllosilicate surface of the aqueous dispersion by means of a solid/liquid separation process, subsequently washing the hierarchically ordered structure with water in order to remove reagents in non-precipitated solution.

5. The method according to claim 4, which further comprises the following step after step d) or e):
   f) adding an organic modifier or coupling agent, in order to organophilise the surface of the hierarchically ordered structure of homogenously distributed submicrometric or nanometric inorganic phosphate particles supported on the phyllosilicate surface.

6. The method according to claim 4, wherein the solid/liquid separation of the hierarchically ordered structure is carried out by means of centrifugation or filtering using filtering equipment selected from the group consisting of a filter press, pressure band filters, vacuum band filters, rotary vacuum filters and Nucha filters.

7. The method according to claim 5, which further comprises the following step after d), e), or f):
   g) eliminating residual water or moisture left in the hierarchically ordered structure, by means of atmospheric pressure drying, under reduced pressure or in a vacuum.

8. The method according to claim 7, which further comprises the following step after step g):
   h) grinding or deagglomerating the dried hierarchically ordered structure, in order to obtain a powdered product.

9. The method according to claim 5, which further comprises the following step after step e) or f):
   i) simultaneously grinding and drying the hierarchically ordered structure using an impact dryer mill.

10. The method according to claim 1, wherein the inorganic phosphate comprises a cation that is selected from the group consisting of Al, Zn, Cd, Fe, Sn, Mn, Ni, Co, B, Sb, W, Mo, Zr, Cu, Ga, In, Be, Mg, Ca, Sr, Ba, $NH_4OH$, Li, Na, K, Rb, Cs and mixtures thereof.

11. The method according to claim 3, wherein the cation and the phosphoric acid have a molar ratio that ranges between 5:1 to 1:1.2.

12. The method according to claim 1, wherein the phyllosilicate is a 2:1 phyllosilicate with laminar or acicular morphology.

13. The method according to claim 12, wherein the 2:1 phyllosilicate is selected from the group consisting of a dioctahedral smectite, trioctahedral smectite, sepiolite, attapulgite and a mixture thereof.

14. The method according to claim 13, wherein the smectite is selected from the group consisting of montmorillonite, saponite, stevensite, beidellite, nontronite, hectorite and a mixture thereof.

15. The method according to claim 13, wherein the sepiolite is a rheological grade sepiolite.

16. The method according to claim 13, wherein the attapulgite is a rheological grade attapulgite.

17. The method according to claim 1, wherein the dispersion of the phyllosilicate in aqueous medium in step b) has a phyllosilicate concentration of between 1% and 25% by weight.

18. The method according to claim 1, wherein the pH of the phyllosilicate dispersion in step b) is adjusted with acid at a pH of less than 3.

19. The method according to claim 18, wherein the acid used to adjust the pH is an organic or inorganic acid.

20. The method according to claim 19, wherein the acid is selected from the group consisting of phosphoric acid, sulphuric acid, chlorohydric acid, nitric acid and mixtures thereof.

21. The method according claim 1, wherein the phyllosilicate dispersion in step b) is carried out at high shear, wherein the peripheral velocity is greater than 10 m/s.

22. The method according to claim 1, wherein the inorganic phosphate/phyllosilicate weight ratio in the hierarchically ordered structure ranges from 70 parts by weight of inorganic phosphate and 30 parts by weight of phyllosilicate to 30 parts by weight of inorganic phosphate and 70 parts by weight of phyllosilicate.

23. The method according to claim 1, wherein the phyllosilicate particles have an average size of less than 150 micrometers.

24. The method according to claim 1, wherein the inorganic phosphate particles precipitated and supported on the phyllosilicate have a size of less than 1 micrometer.

25. The method according to claim 5, wherein the organic modifier agent used in step f) is selected from the group consisting of quaternary ammonium salts, quaternary phosphonium salts, polyaminates, polyglycols, silicon oils, polydimethylsiloxanes, organo-metal compounds, amines, polyamines, and any combination thereof.

26. The method according to claim 25, wherein the organo-metal compound is selected from the group consisting of:
organo-silanes,
organo-titanates,
organo-zirconates
and any combination thereof.

27. The method according to claim 25, wherein the quaternary ammonium salt is selected from the group consisting of: trimethyl alkyl ammonium, dimethyl benzyl alkyl ammonium, dimethyl dialkyl ammonium, methyl benzyl dialkyl ammonium, dimethyl alkyl 2-ethylhexyl ammonium and methyl alkyl bis-2-hydroxyethyl ammonium salts, wherein the alkyl chain has at least 12 carbon atoms, which are either synthetic or of natural origin, such as tallow or hydrogenated tallow; the phosphonium salt being selected from the group consisting of trihexyl (tetradecyl) phosphonium, tributyl (tetradecyl) phosphonium, tetrabutyl phosphonium and tetra-n-octyl phosphonium salts.

28. The method according to claim 1, wherein the inorganic phosphate precipitated and supported on the phyllosilicate in the hierarchically ordered structure is selected from the group consisting of:
aluminium phosphate,
monobasic aluminium phosphate,
dibasic aluminium phosphate,
and any combination thereof.

29. The method according to claim 27, wherein the phyllosilicate of the hierarchically ordered structure is sepiolite.

30. The method according to claim 29, wherein the aluminium/sepiolite phosphates ratio in the hierarchically ordered structure is 50:50 by weight.

31. The method according to claim 30, wherein the surface of the hierarchically ordered structure of aluminium/sepiolite phosphates with a ratio of 50:50 by weight is modified with a quaternary ammonium salt.

32. The method according to claim 31, wherein the quaternary ammonium salt is a dimethyl di(hydrogenated tallow) ammonium salt.

33. The method according to claim 32, wherein the percentage of dimethyl di(hydrogenated tallow) ammonium salt is between 10% and 30% by weight with respect to the weight of the hierarchically ordered structure of aluminium/sepiolite phosphates.

34. The method according to claim 1, wherein the hierarchically ordered structure is mixed with other particles of organic or inorganic materials, using physical dry or wet methods.

35. The method according to claim 1, wherein the dispersion of the phyllosilicate in aqueous medium in step b) has a phyllosilicate concentration of between 4% and 12% by weight.

36. The method according to claim 1, wherein the inorganic phosphate/phyllosilicate weight ratio in the hierarchically ordered structure varies between 60 parts by weight of inorganic phosphate and 40 parts by weight of phyllosilicate and 40 parts by weight of inorganic phosphate and 60 parts by weight of phyllosilicate.

37. The method according to claim 1, wherein the phyllosilicate particles have an average particles size of less than 45 micrometers.

38. The method according to claim 1, wherein the inorganic phosphate particles precipitated and supported on the phyllosilicate have a size smaller than 100 nanometers.

* * * * *